United States Patent
Qiao

(10) Patent No.: US 10,461,796 B2
(45) Date of Patent: Oct. 29, 2019

(54) MULTIMODE RECEIVING DEVICE, MULTIMODE TRANSMITTING DEVICE AND MULTIMODE TRANSCEIVING METHOD

(71) Applicant: Silergy Semiconductor Technology (Hangzhou) LTD, Hangzhou, ZheJiang Province (CN)

(72) Inventor: Junjie Qiao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 164 days.

(21) Appl. No.: 15/657,495

(22) Filed: Jul. 24, 2017

(65) Prior Publication Data

US 2018/0034498 A1  Feb. 1, 2018

(30) Foreign Application Priority Data

Jul. 27, 2016  (CN) .......................... 2016 1 0600898

(51) Int. Cl.
| | |
|---|---|
| *H04B 1/403* | (2015.01) |
| *H04W 88/06* | (2009.01) |
| *H04L 27/14* | (2006.01) |
| *H04B 1/48* | (2006.01) |
| *H04B 1/18* | (2006.01) |
| *H04B 1/401* | (2015.01) |
| *H04W 72/12* | (2009.01) |

(Continued)

(52) U.S. Cl.
CPC .............. *H04B 1/406* (2013.01); *H04B 1/18* (2013.01); *H04B 1/401* (2013.01); *H04B 1/48* (2013.01); *H04L 25/02* (2013.01); *H04L 27/14* (2013.01); *H04L 27/2017* (2013.01); *H04W 72/1215* (2013.01); *H04W 88/06* (2013.01)

(58) Field of Classification Search
None
See application file for complete search history.

(56) References Cited

U.S. PATENT DOCUMENTS 5,960,040 A  *  9/1999  Cai ........................ H04L 1/0054
329/304
6,363,100 B1 *  3/2002  Ohki ................... H04L 27/2082
329/304

(Continued)

FOREIGN PATENT DOCUMENTS

| CN | 103036594 A | 4/2013 | |
|---|---|---|---|
| CN | 104363118 A | 2/2015 | |
| WO | WO-2017196220 A1 * | 11/2017 | ........... H04B 1/0053 |

*Primary Examiner* — Ayaz R Sheikh
*Assistant Examiner* — Faiyazkhan Ghafoerkhan
(74) *Attorney, Agent, or Firm* — Michael C. Stephens, Jr.

(57) ABSTRACT

A multimode receiving device configured to receive a standard Bluetooth data packet and a physical layer data packet with enhanced performance, can include: a receiving circuit configured to convert a received radio frequency signal to a baseband modulated signal; a demodulation circuit configured to select a demodulation scheme that conforms to a Bluetooth standard or one of a plurality of despread demodulation schemes, in order to demodulate the baseband modulated signal; and the plurality of despread demodulation schemes being configured to correspond to a plurality of predetermined spread-spectrum modulation schemes.

17 Claims, 11 Drawing Sheets

(51) Int. Cl.
*H04L 25/02* (2006.01)
*H04L 27/20* (2006.01)

(56) References Cited

U.S. PATENT DOCUMENTS

| | | | | |
|---|---|---|---|---|
| 6,996,156 B1* | 2/2006 | Ono | | H04L 27/2273 |
| | | | | 375/147 |
| 7,054,296 B1* | 5/2006 | Sorrells | | H04B 1/406 |
| | | | | 370/338 |
| 7,248,573 B2* | 7/2007 | Harrison | | H04L 12/4625 |
| | | | | 370/338 |
| 7,864,682 B2* | 1/2011 | Appaji | | H04L 12/66 |
| | | | | 370/235 |
| 8,385,345 B2* | 2/2013 | Ji | | H04L 45/00 |
| | | | | 370/394 |
| 8,391,255 B2* | 3/2013 | Ribiere | | H04L 47/10 |
| | | | | 370/254 |
| 2006/0215736 A1* | 9/2006 | Rasmussen | | H04B 1/7085 |
| | | | | 375/146 |
| 2006/0292986 A1* | 12/2006 | Bitran | | H04W 16/14 |
| | | | | 455/41.2 |
| 2007/0248038 A1* | 10/2007 | Yamasaki | | H04B 7/022 |
| | | | | 370/328 |
| 2008/0253353 A1* | 10/2008 | Feher | | H04M 3/382 |
| | | | | 370/347 |
| 2008/0304828 A1* | 12/2008 | Mizutani | | H04B 1/707 |
| | | | | 398/78 |
| 2009/0076803 A1* | 3/2009 | Feher | | H04M 3/382 |
| | | | | 704/201 |
| 2009/0092114 A1* | 4/2009 | Feher | | H04M 3/382 |
| | | | | 370/338 |
| 2009/0098852 A1* | 4/2009 | Feher | | H04M 3/382 |
| | | | | 455/404.2 |
| 2009/0116567 A1* | 5/2009 | Chen | | H04L 25/0212 |
| | | | | 375/260 |
| 2009/0161529 A1* | 6/2009 | Speth | | H04B 1/40 |
| | | | | 370/210 |
| 2009/0209272 A1* | 8/2009 | Palanki | | H04L 27/2655 |
| | | | | 455/458 |
| 2010/0029284 A1* | 2/2010 | Feher | | H04M 3/382 |
| | | | | 455/440 |
| 2010/0112950 A1* | 5/2010 | Haartsen | | H04B 5/0056 |
| | | | | 455/41.3 |
| 2010/0124920 A1* | 5/2010 | Feher | | H04W 64/00 |
| | | | | 455/426.1 |
| 2010/0272154 A1* | 10/2010 | Lakkis | | H04B 1/707 |
| | | | | 375/140 |
| 2010/0303183 A1* | 12/2010 | Desai | | H04B 1/1027 |
| | | | | 375/350 |
| 2012/0224617 A1* | 9/2012 | Feher | | H04M 3/382 |
| | | | | 375/222 |
| 2012/0294396 A1* | 11/2012 | Desai | | H04B 1/1027 |
| | | | | 375/343 |
| 2013/0148696 A1* | 6/2013 | Ryu | | H04B 1/707 |
| | | | | 375/146 |
| 2014/0119477 A1* | 5/2014 | Hong | | H04L 27/06 |
| | | | | 375/340 |
| 2014/0199995 A1* | 7/2014 | Singh | | G06F 13/1663 |
| | | | | 455/426.1 |
| 2015/0365158 A1* | 12/2015 | Kindler | | H04B 7/15542 |
| | | | | 370/315 |
| 2016/0081101 A1* | 3/2016 | Yu | | H04W 52/0258 |
| | | | | 370/329 |
| 2016/0128117 A1* | 5/2016 | Engelien-Lopes | | H04W 76/14 |
| | | | | 455/41.2 |
| 2016/0128126 A1* | 5/2016 | Engelien-Lopes | | H04L 1/0009 |
| | | | | 370/329 |
| 2016/0365890 A1* | 12/2016 | Reynolds | | H04B 1/18 |
| 2017/0041169 A1* | 2/2017 | Feher | | H04W 64/00 |
| 2017/0048031 A1* | 2/2017 | Feher | | H04W 64/00 |
| 2017/0099077 A1* | 4/2017 | Tamma | | H04L 25/03012 |
| 2017/0279486 A1* | 9/2017 | Faragher | | H04B 1/709 |
| 2017/0359098 A1* | 12/2017 | Tamma | | H04L 25/03012 |

* cited by examiner

MULTIMODE RECEIVING DEVICE, MULTIMODE TRANSMITTING DEVICE AND MULTIMODE TRANSCEIVING METHOD

RELATED APPLICATIONS

This application claims the benefit of Chinese Patent Application No. 201610600898.5, filed on Jul. 27, 2016, which is incorporated herein by reference in its entirety.

FIELD OF THE INVENTION

The present invention generally relates to wireless communication technology, and more particularly to multimode receiving devices, multimode transmitting devices, and associated methods.

BACKGROUND

With the development of Internet of Things (IOT) technology, more and more intelligent pieces of equipment are being connected to networks. Mesh networks have garnered increasing attention due to its dynamic extensibility, higher connectivity, higher reliability, and higher stability, as compared to other approaches. Intelligent equipment as terminals may initially be connected to a mesh network, and then can be connected to other networks of the same or different types, in order to achieve remote management, timing control, parameter regulation, and other functions.

DETAILED DESCRIPTION

Figure 1A:
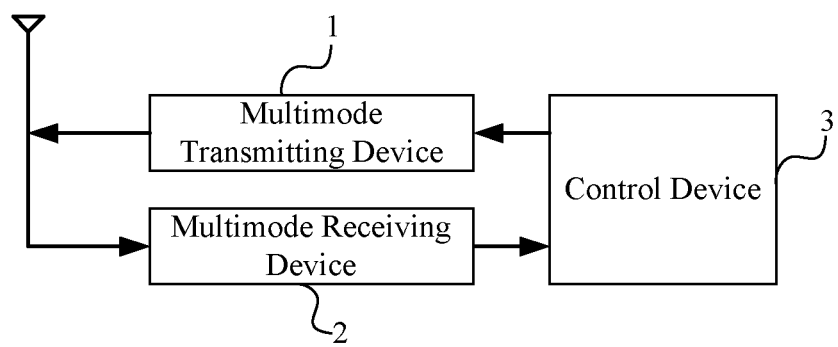
FIG. 1A is a schematic block diagram of example mesh network nodes, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A mesh network is a network architecture that includes a network controller and a plurality of node devices. There may be one or more network controllers, and a plurality of node devices. The controller can be used for communication scheduling between the nodes and for communication routes between the nodes and external network. A node can access the external network via the network controller. Typically, only one controller controls the network at any given time. In some approaches, the controller can implement the mesh network by broadcasting, under various protocols. For example, the mesh network can be based on the Bluetooth standard 4.0 or Bluetooth Low Energy (BLE) standard.

In the mesh network, data may be forwarded via adjacent nodes, instead of via direct connections over relatively long distances, which is known as multi-hop communication. The node device can forward a received data packet in order to implement transfer of data. In this way, a node can be used as a relay node to pass messages. Throughout the network, the nodes can forward data based on random delay. However, when using the Bluetooth protocol as a communication interface, the wireless interface may have a limited transmission distance (e.g., less than about 20 meters). When one hop distance is too large, the node devices of the mesh network cannot communicate normally, or may be susceptible to interference. In particular embodiments, reception sensitivity can be improved as compared to other approaches.

In one embodiment, a multimode receiving device configured to receive a standard Bluetooth data packet and a physical layer data packet with enhanced performance, can include: (i) a receiving circuit configured to convert a received radio frequency signal to a baseband modulated signal; (ii) a demodulation circuit configured to select a demodulation scheme that conforms to a Bluetooth standard or one of a plurality of despread demodulation schemes, in order to demodulate the baseband modulated signal; and (iii) the plurality of despread demodulation schemes being configured to correspond to a plurality of predetermined spread-spectrum modulation schemes.

In one embodiment, a multimode transmitting device being configured to transmit a standard Bluetooth data packet and a physical layer data packet of enhanced performance, can include: (i) a modulation circuit configured to modulate a Bluetooth baseband signal by selecting a modulation scheme conforming to a Bluetooth standard or one of a plurality of spread-spectrum modulation schemes, and to output a baseband modulated signal; and (ii) a receiving circuit configured to convert the baseband modulated signal to a radio frequency signal.

In one embodiment, a multimode transceiving method can include: (i) modulating a Bluetooth baseband signal by selecting a modulation scheme conforming to a Bluetooth standard or one of a plurality of spread-spectrum modulation schemes and sending a baseband modulated signal; and (ii) demodulating a received baseband modulated signal by selecting a demodulation scheme conforming to a Bluetooth standard or one of a plurality of despread demodulation schemes, where the plurality of despread demodulation schemes correspond to a plurality of predetermined spread-spectrum modulation schemes.

Referring now to FIG. 1A, shown is a schematic block diagram of example mesh network nodes, in accordance with embodiments of the present invention. In this example, the mesh network nodes can each include multimode transmitting device 1, multimode receiving device 2, and control device 3. Multimode transmitting device 1 can transmit a standard Bluetooth data packet and a physical layer data packet of enhanced performance. The multimode receiving device 2 can receive the standard Bluetooth data packet and the physical layer data packet of enhanced performance. Control device 3 can control multimode transmitting device 1 and multimode receiving device 2 to transceive (e.g., transmit and/or receive) data based on a data communication protocol of the mesh network. For example, control device 3 can modulate a received physical layer data packet with enhanced performance to a standard Bluetooth data packet by multimode transmitting device 1. In another example, control device 3 can modulate a received standard Bluetooth data packet to a physical layer data packet with enhanced performance by multimode transmitting device 1.

In addition, control multimode transmitting device 1 and multimode receiving device 2 may only transceive the standard Bluetooth data packet or the physical layer data packet with enhanced performance. For example, the physical layer with enhanced performance is a spread-spectrum modulated data packet. In one example, the Bluetooth baseband signal can be converted to a spread signal with its symbol rate being the same as the chip rate of the Bluetooth baseband signal by applying a spreading sequence with the same rate. Chips of the spread signals that correspond to different spread-spectrum modulation schemes may have different symbol amounts, where the symbol amount is referred to as the spreading length.

Figure 1B:
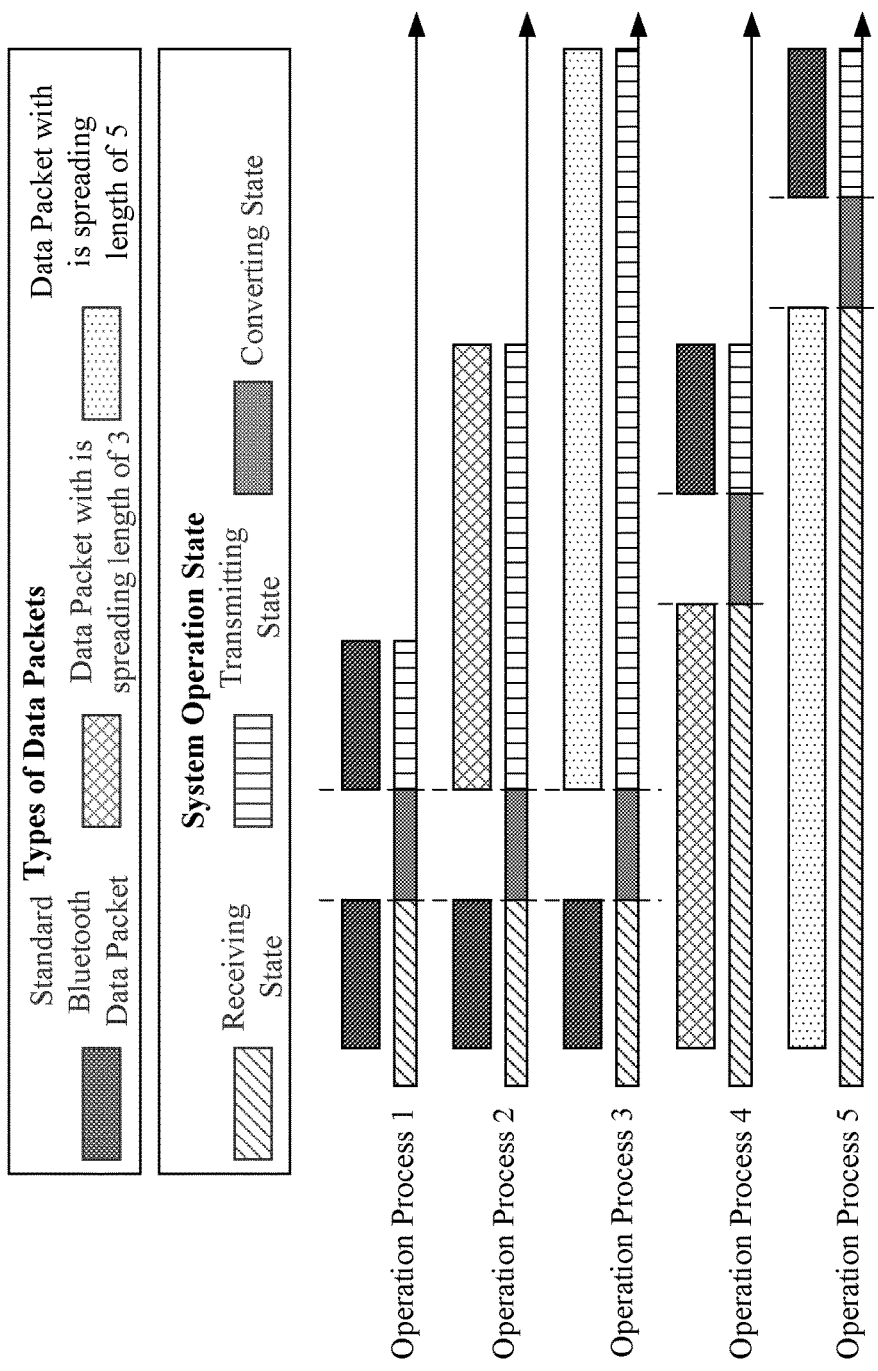
FIG. 1B is a diagram of an example data transceiving process of mesh network nodes, in accordance with embodiments of the present invention.

Referring now to FIG. 1B, shown is a diagram of an example data transceiving process of mesh network nodes, in accordance with embodiments of the present invention. Data packets having spreading lengths of 3 and 5 are primarily described as examples herein, but packets having other spreading lengths can also be supported in certain embodiments. The mesh network nodes may have three states during the operation: a receiving state, a transmitting state, and a converting state. In operation process 1, the mesh network nodes can receive and forward a standard Bluetooth data packet. In operation process 2, the mesh network nodes can convert the received standard Bluetooth data packet to a data packet with its spreading length of 3, and then forward the converted data packet. The converted data packet being spread processed by a spreading length of 3 may have the same content as the Bluetooth data packet.

In operation process 3, the mesh network nodes can convert the standard Bluetooth data packet to a data packet with its spreading length of 5, and may then forward the converted data packet. In operation process 4, the mesh network nodes can convert the data packet with its spreading length of 3 to a standard Bluetooth data packet, and then forward the standard Bluetooth data packet. In operation process 5, the mesh network nodes can convert the data packet with its spreading length of 5 to a standard Bluetooth data packet, and may then forward the standard Bluetooth data packet. In this way, the conversion between the standard Bluetooth data packet and the physical layer data packet with enhanced performance can be realized, in order to set up a mesh network compatible with Bluetooth standards on the basis of a physical layer communication interface with enhanced performance.

Figure 2A:
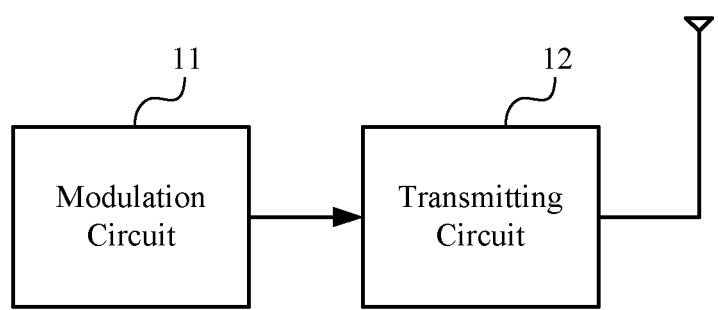
FIG. 2A is a schematic block diagram of an example multimode transmitting device, in accordance with embodiments of the present invention.

Referring now to FIG. 2A, shown is a schematic block diagram of an example multimode transmitting device, in accordance with embodiments of the present invention. In this example, multimode transmitting device 1 can include modulation circuit 11 and transmitting circuit 12. Modulation circuit 11 can modulate a Bluetooth baseband signal by selecting a modulation scheme conforming to a Bluetooth standard, or one of a plurality of spread-spectrum modulation schemes, and may output a baseband modulated signal. The Bluetooth baseband signal may be transmitted to multimode transmitting device 1 by control device 3. Control device 3 can also control multimode transmitting device 1 to select other modulation schemes by sending instructions. Transmitting circuit 11 can convert the baseband modulated signal to a radio frequency signal. In one particular example, the Bluetooth standard is a Bluetooth Lower Energy (BLE) standard, and the modulation scheme conforming to the BLE standard is 1 Mbps Gauss Frequency Shift Keying (GFSK) modulation. The spread-spectrum modulation scheme can spread the Bluetooth baseband signal to obtain a spread signal, and then may perform 1 Mbps GFSK modulation or other modulations on the spread signal to obtain the baseband modulated signal.

Spread spectrum is a technology that uses information processing to improve transmission performance. The purpose and function of this technology is to spread the frequency spectrum of a signal before information transmission, and to obtain strong anti-interference ability and high transmission rate by using the wide frequency spectrum. In the implementation of this technology, spread spectrum is usually divided into the following approaches: direct sequence (DS) spread spectrum, frequency hopping (FH) spread spectrum, time hopping (TH) spread spectrum, and Chirp spread spectrum, and so on. In the DS spread spectrum example, a spreading sequence with a higher chip rate can process the signal to be transmitted (e.g., the baseband modulated signal), so as to spread the frequency of the baseband modulated signal.

In addition, at the receiving terminal, the same spreading sequence can be used to despread the transmitted signal, in order to recover the information. In this particular example, modulation circuit 12 can use a plurality of spread spectrum modulation schemes. For example, a spread spectrum modulation scheme using spreading sequences of different chip rates or different types can be employed. In this fashion, the mesh network nodes can transmit according to a Bluetooth standard, or other methods with enhanced performance at the physical layer.

Figure 2B:
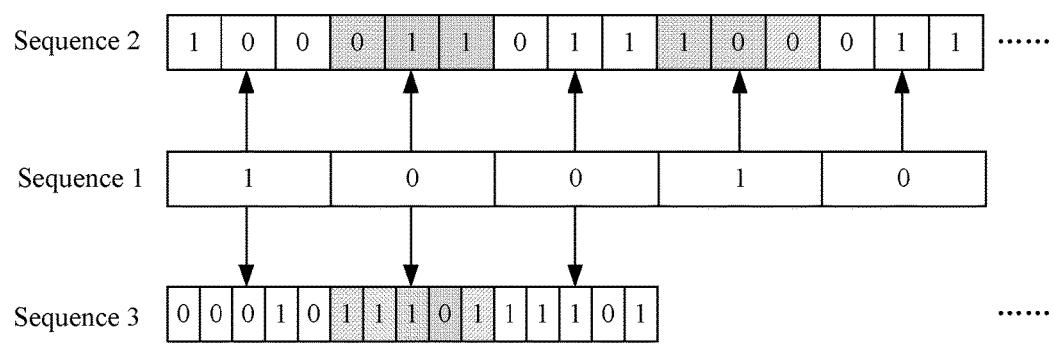
FIG. 2B is a diagram of an example Bluetooth baseband sequence and a spreading sequence, in accordance with embodiments of the present invention.

Referring now to FIG. 2B, shown is a diagram of an example Bluetooth baseband sequence and a spreading sequence, in accordance with embodiments of the present invention. In this particular example, sequence 1 is a Bluetooth baseband signal sequence to be transmitted, and a segment of the sequence is "10010". Sequence 2 can be a signal sequence obtained by spreading the spread spectrum sequence (e.g., a pseudorandom sequence or a sequence with a predetermined length) with a rate 3 times the Bluetooth baseband signal sequence. For example, every 3 bits of the spread spectrum can correspond to one bit of the Bluetooth baseband signal sequence. Sequence 3 can be a signal sequence obtained by spreading the spread spectrum sequence with a rate 5 times the Bluetooth baseband signal sequence. For example, every 5 bits of the spread spectrum can correspond to one bit of the Bluetooth baseband signal sequence. In this way, the chip rate of the spread signal can be the same as the chip rate of the Bluetooth baseband signal. Also, the symbol rates of the spread signals may be 3 times and 5 times the chip rate of the Bluetooth baseband signal, respectively.

In one example, the spreading sequence can be a pseudorandom sequence. Also, sequences with a predetermined length can be used to replace 1 and 0 of the Bluetooth baseband signal. Because the original one bit is replaced by several bits in this case, it may also be considered as a spreading operation in which different spread-spectrum modulation schemes correspond to sequences of different lengths. In one example, two-bit sequences [1 0] and [0 1] can be used to replace 1 and 0 of the Bluetooth baseband signal, respectively. In another example, three-bit sequences [1 0 0] and [1 1 0] may be used to replace 1 and 0 of the Bluetooth baseband signal, respectively. In such manner, the spread signal obtained by using sequences with predetermined lengths may have a wider bandwidth. That is to say, in particular embodiments, "spread spectrum" operation may not be limited to employment of a pseudorandom sequence, but can also utilize several bits to replace one bit, in order to form a new data sequence.

Figure 2C:
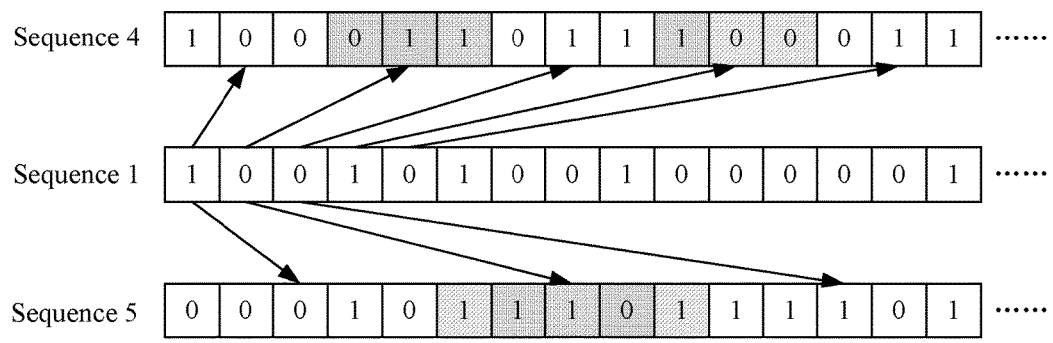
FIG. 2C is a diagram of another example Bluetooth baseband sequence and a spreading sequence, in accordance with embodiments of the present invention.

Referring now to FIG. 2C, shown is a diagram of another example Bluetooth baseband sequence and a spreading sequence, in accordance with embodiments of the present invention. In this particular example, sequence 1 is a Bluetooth baseband signal sequence to be transmitted, and a segment of the sequence is "10010". Sequence 4 can be a signal sequence obtained by spreading the Bluetooth baseband signal of a decreased rate with a spreading sequence having a rate that is the same as that of the Bluetooth baseband signal. For example, every 3 bits of the spread spectrum may correspond to one bit of the Bluetooth baseband signal sequence. For example, the symbol rate of sequence 4 is the same as the chip rate of the Bluetooth baseband signal, where each chip includes 3 symbols, so the length of sequence 4 is 3 times the Bluetooth baseband signal. Correspondingly, the chip rate of sequence 4 is 1/3 of the Bluetooth baseband signal sequence. Sequence 5 can be a signal sequence obtained by spreading the Bluetooth baseband signal of decreased rate with a spreading sequence having a rate that is the same as that of the Bluetooth baseband signal. For example, every 5 bits of the spread spectrum can correspond to one bit of the Bluetooth baseband signal sequence.

In addition, the symbol rate of the sequence 5 can be the same as the chip rate of the Bluetooth baseband signal, where each chip includes 5 symbols, so the length of the sequence 5 is 5 times the Bluetooth baseband signal. Correspondingly, the chip rate of sequence 5 can be 1/5 of the Bluetooth baseband signal sequence. That is to say, a plurality of spread-spectrum modulation schemes may adopt spreading sequences with the same rate to convert a Bluetooth baseband signal to a spread signal with its symbol rate being the same as that of the Bluetooth baseband signal. Chips of the spread signals corresponding to different spread-spectrum modulation schemes may have different symbol amounts. The spread spectrum example of FIG. 2C can extend the period of the Bluetooth baseband signal, and then may use spreading sequences to complete the operation.

Similar to FIG. 2B, the spreading sequence can be a pseudorandom sequence in some examples. Also, sequences with a predetermined length can be used to replace 1 and 0 of the Bluetooth baseband signal. Because the original one bit may be replaced by several bits, it can also be considered as a spreading operation in which different spread-spectrum modulation schemes correspond to sequences of different lengths. In one example, two-bit sequences [1 0] and [0 1] can be used to replace 1 and 0 of the Bluetooth baseband signal respectively. In another example, three-bit sequences [1 0 0] and [1 1 0] may be used to replace 1 and 0 of the Bluetooth baseband signal, respectively.

The signal obtained in the manner as described above may have the same rate as the Bluetooth baseband signal, so it can be modulated and further transmitted by modulation schemes suitable for Bluetooth baseband signals. Therefore, the physical layer performance of the data packet can be enhanced, and may be compatible with aspects of the Bluetooth system. Better physical layer performance can be achieved at the lowest cost instead of significant modification of the Bluetooth transmitting circuit or modulation schemes. In addition, since the spread signal may have the same rate as the Bluetooth baseband signal, and the standard Bluetooth device may not receive the data packet of such type, the mesh network may have better security. For example, modulation circuit 12 can be implemented by an application specific integrated circuit (ASIC) with different function modules, or by a general digital signal processor (DSP) with predetermined program instructions.

Figure 3A:
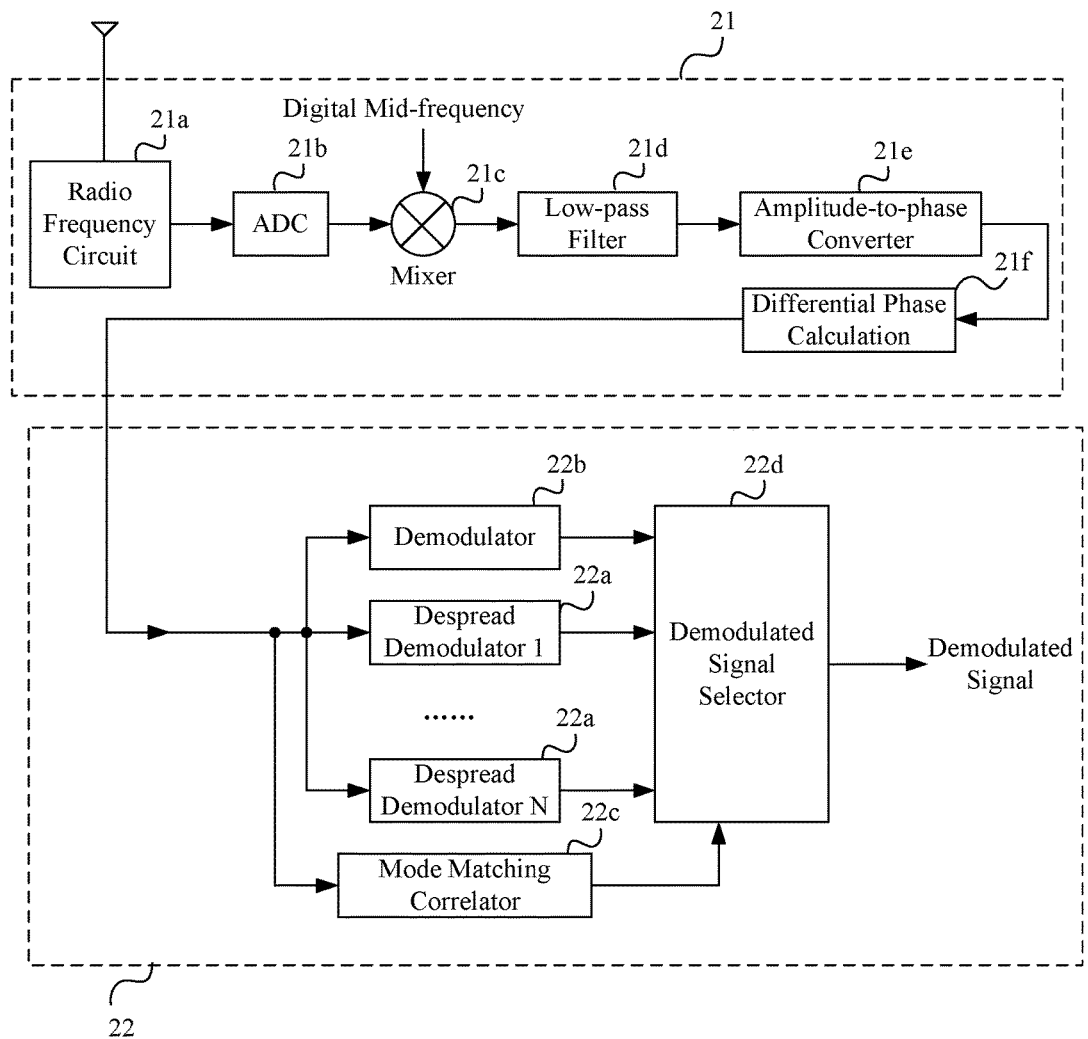
FIG. 3A is schematic block diagram of an example multimode receiving device, in accordance with embodiments of the present invention.

Referring now to FIG. 3A, shown is schematic block diagram of an example multimode receiving device, in accordance with embodiments of the present invention. Multimode receiving device 2 can receive a data packet transmitted by multimode transmitting device 1. In this particular example, multimode receiving device 2 can automatically identify that the received data packet is a standard Bluetooth data packet or a spread data packet, and can accordingly select a despread demodulation scheme. For example, multimode receiving device 2 can include receiving circuit 21 and demodulation circuit 22. Receiving circuit 21 can convert a received radio frequency signal to a baseband modulated signal. Receiving circuit 21 can include radio frequency circuit 21a, analog-to-digital converter (ADC) 21b, mixer 21c, low-pass filter 21d, amplitude-to-phase converter 21e, and differential phase signal obtaining circuit 21f. These circuits may be cascade-coupled in sequence in order to convert a wireless signal to a baseband modulated signal in the form of a digital signal that is supplied to demodulation circuit 22 for demodulation. Demodulation circuit 22 can demodulate the baseband modulated signal by selecting a demodulation scheme conforming to a Bluetooth standard, or one of a plurality of despread demodulation schemes.

Demodulation circuit 22 can include despread demodulators 22a, demodulator 22b, mode matching correlator 22c, and demodulated signal selector 22d. Each of despread demodulators 22a may have a corresponding despread demodulation scheme, which can be used to demodulate the baseband modulated signal and output a demodulated signal based on the corresponding despread demodulation scheme. Demodulator 22b can demodulate the baseband modulated signal and output a corresponding demodulated signal based on a demodulation scheme conforming to the Bluetooth standard. A plurality of demodulated signals may be provided to demodulated signal selector 22d. Mode matching correlator 22c can be used to acquire a correlation signal by associating a portion of a Bluetooth data packet access code (e.g., the first 16 bits of the access code) and a corresponding spreading sequence of a plurality of spread-spectrum modulation schemes with the baseband modulated signal, and to output a mode selection signal based on the correlation signal.

The mode selection signal can be used to indicate which scheme is employed for demodulation (e.g., which one of a plurality of input of demodulated signal selector 22*d* is taken as output). For example, mode matching correlator 22*c* can determine the reception timeout when the predetermined demodulated signal is not received in a predetermined time, and then end the reception state, and output a mode selection signal to indicate the reception timeout. Demodulated signal selector 22*d* can select and output one of the demodulated signals based on the mode selection signal. When the baseband modulated signal is spread spectrum modulated by a spreading sequence, the baseband modulated signal may be associated with a corresponding spreading sequence to obtain a correlation signal with its amplitude larger than a predetermined threshold. In this way, which scheme to be employed for demodulation can be determined according to the amplitudes of different spreading sequences and sequences related to the received baseband modulated signal at the receiving terminal.

Figure 3B:
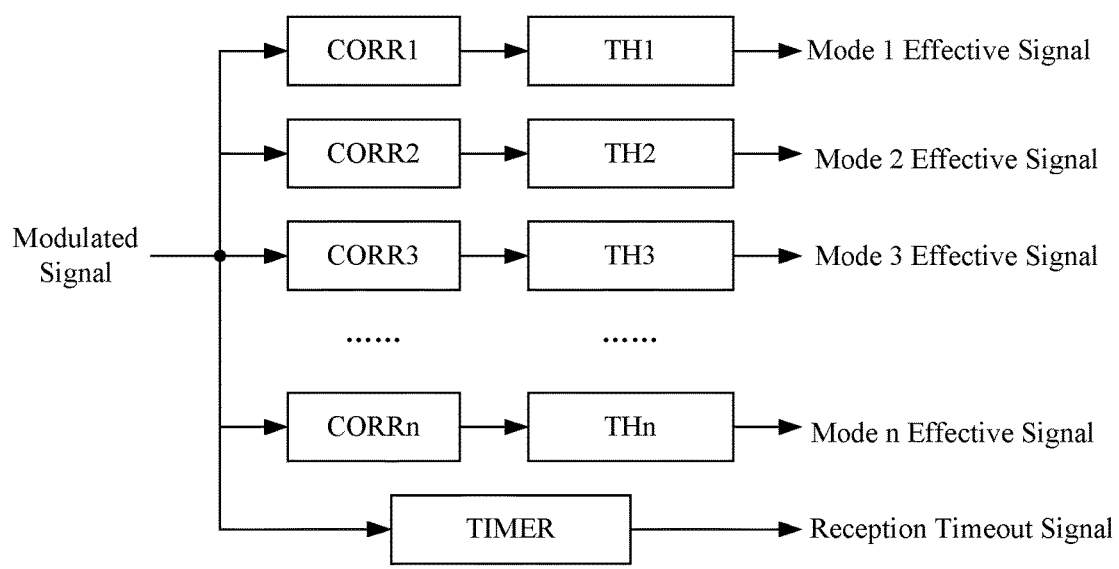
FIG. 3B is schematic block diagram of an example mode matching correlator, in accordance with embodiments of the present invention.

Referring now to FIG. 3B, shown is schematic block diagram of an example mode matching correlator, in accordance with embodiments of the present invention. In this example, mode matching correlator 22*c* can include correlators CORR1 to CORRN and a plurality of threshold comparators TH1 to THN. Correlators CORR1 to CORRN can be used to associate the baseband modulated signal with a part of a Bluetooth data packet access code corresponding to the correlators or a spreading sequence, and to output a correlation signal. A plurality of threshold comparators TH1 to THN may correspond to correlators CORR1 to CORRN, and can output a corresponding mode selection signal when the correlation signal output by a corresponding correlator is greater than a predetermined threshold. Those skilled in the art will recognize that the demodulation circuit can also be implemented by other circuit interfaces or module structures.

Figure 4A:
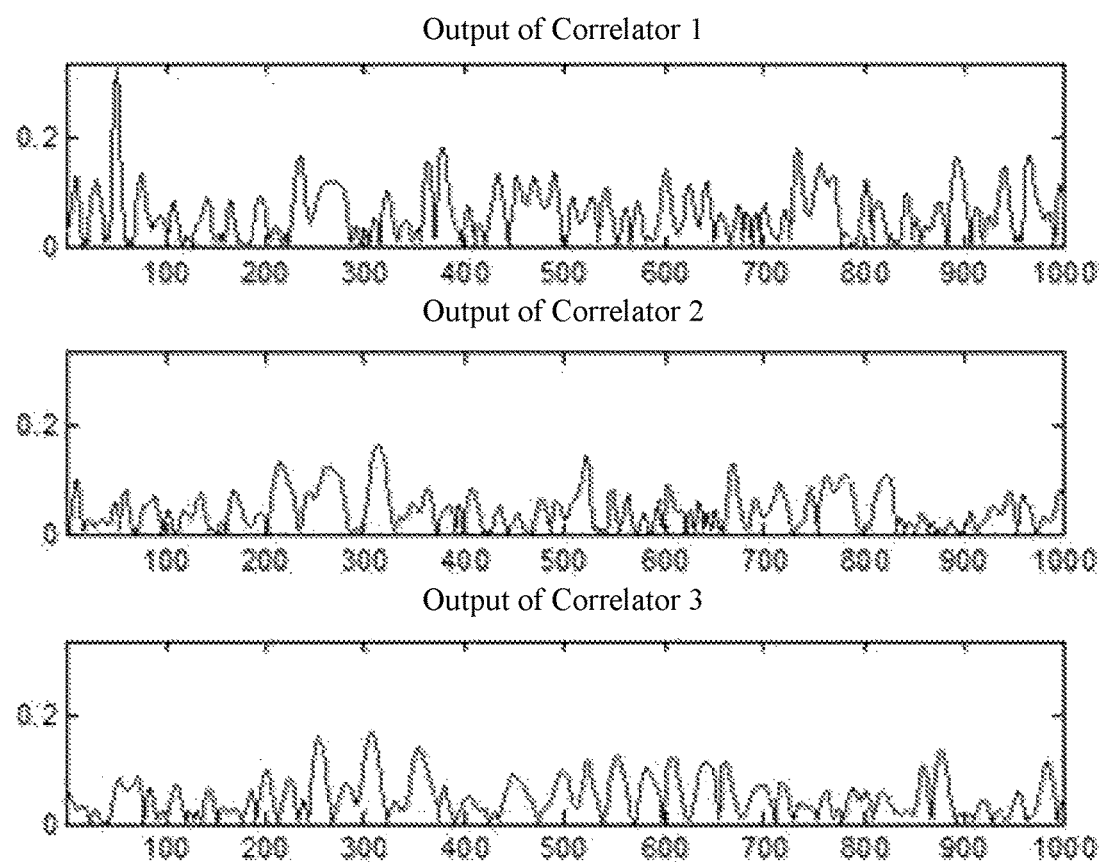
FIGS. 4A-4C are diagrams of example correlation signals generated by correlators of a multimode receiving device based on different correlation schemes, in accordance with embodiments of the present invention.
Figure 4B:
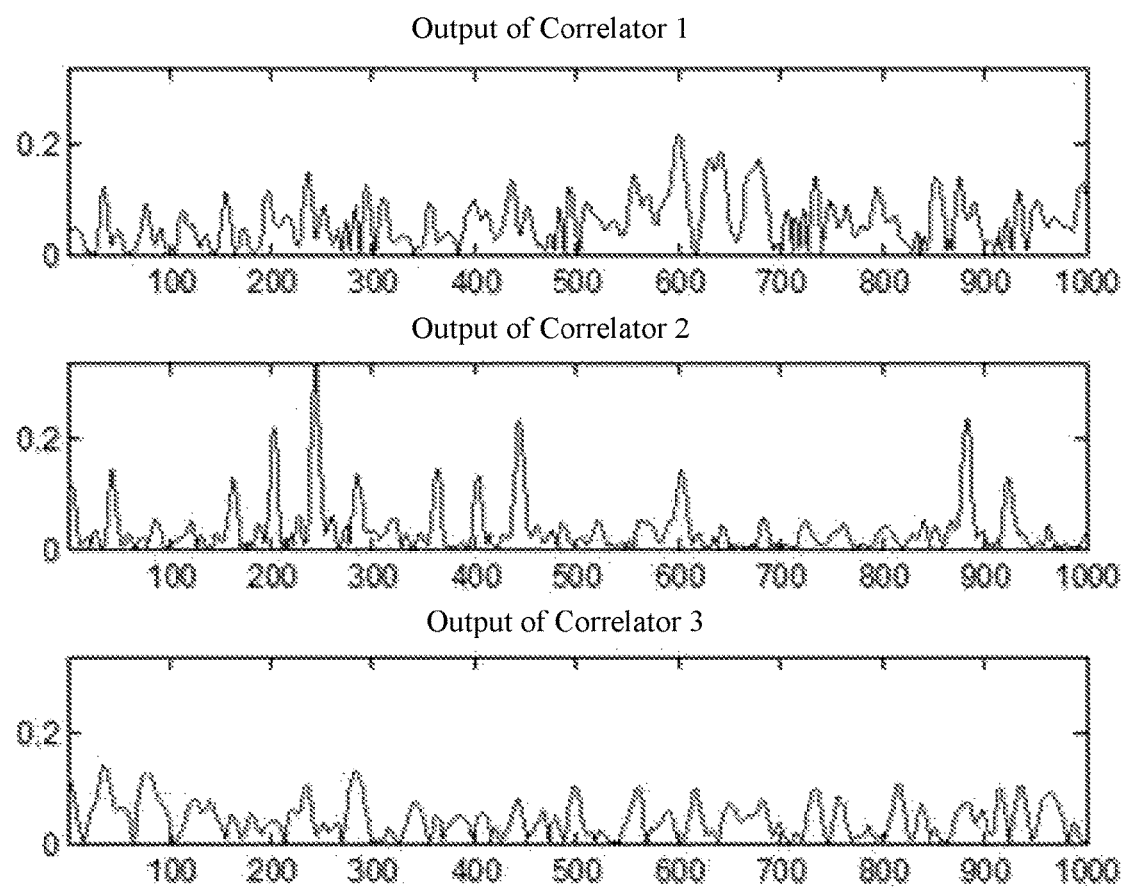
Figure 4C:
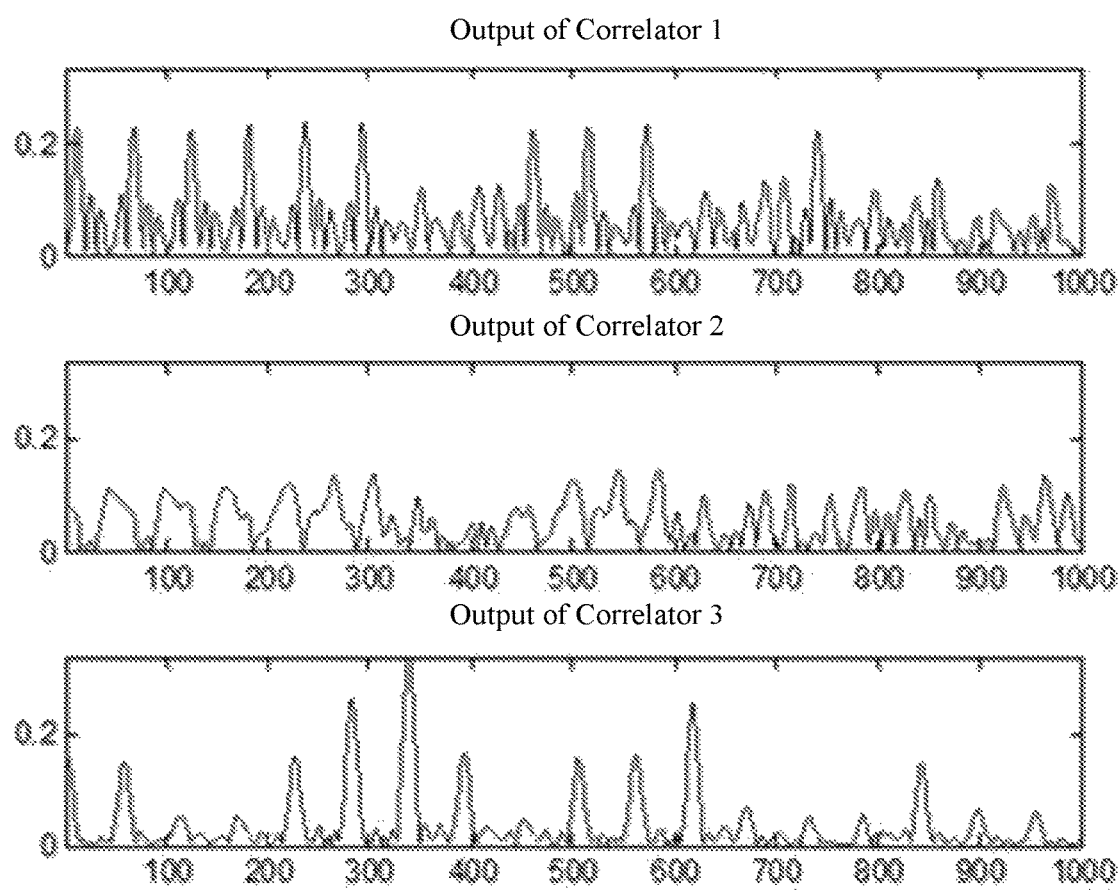

Referring now to FIGS. 4A-4C, shown are diagrams of example correlation signals generated by correlators of a multimode receiving device based on different correlation schemes, in accordance with embodiments of the present invention. In these examples, correlator 1 may utilize the first 16 bits of the access code for correlation. Correlators 2 and 3 can use spreading sequences with the same rate as the Bluetooth baseband signal for correlation. Here the spreading sequence used by correlator 2 may form chips with its spreading length of 5 (e.g., the chip rate of the spread signal is 1/5 of the Bluetooth baseband signal), and the spreading sequence used by correlator 3 may form chips with its spreading length of 7 (e.g., the chip rate of the spread signal is 1/7 of the Bluetooth baseband signal), so the lengths of the two spreading sequences are different. However, when spread signals with different lengths are used for correlation, the correlation signals may also be different.

FIG. 4A shows waveforms of correlation signals obtained by a standard Bluetooth data packet by using different correlators. It can be seen that correlator 1 may have a large correlation value at the position where the 16 chips appear, while correlators 2 and 3 do not have such a large correlation value, so that it can be determined that the data packet is a Bluetooth data packet not being spread. FIG. 4B shows waveforms of correlation signals obtained by correlating the data packet with its spreading length of 5 by using different correlators. It can be seen that the correlator 2 may have a relatively large correlation value while correlators 1 and 3 do not have such a large correlation value, so that it can be determined that the data packet is spread by a spreading length of 5. FIG. 4C shows waveforms of correlation signals obtained by correlating the data packet with its spreading length of 7 by using different correlators. It can be seen that correlator 3 may have a relatively large correlation value, while correlators 1 and 2 do not have such large correlation value, so that it can be determined that the data packet is spread by a spreading length of 7.

The examples of FIGS. 4A to 4C also show that the time points where the largest matching correlation value of different correlators appears are different due to different lengths of correlation sequences. Thus, the timeout period can be obtained by calculating a time period where the maximum matching correlation value of the sequence with the longest length appears based on the length of a corresponding sequence, and then by setting a value larger than the time period as the timeout period. When the correlation signal being larger than a threshold is not detected during a continuous timeout period, the reception timeout may be determined and the reception state is turned off.

Correspondingly, timeout calculation module TIMER can be set in mode matching correlator 22*c* for monitoring the reception timeout. For example, the demodulation circuit can be implemented by an application specific integrated circuit (ASIC) with different function modules, or by a general digital signal processor (DSP) with predetermined program instructions. In this particular example, the Bluetooth standard is a Bluetooth Low Energy standard. In particular embodiments, a Bluetooth baseband signal can be modulated by selecting one of a plurality of spread-spectrum modulation schemes in order to obtain a physical layer data packet with enhanced performance. In addition, the physical layer data packet with enhanced performance can be received by selecting a demodulation method based on a spreading sequence and a correlation signal of a received signal. In this way, compatibility with the Bluetooth standard can be achieved, as well as improving the communication sensitivity of a mesh network.

Figure 5:
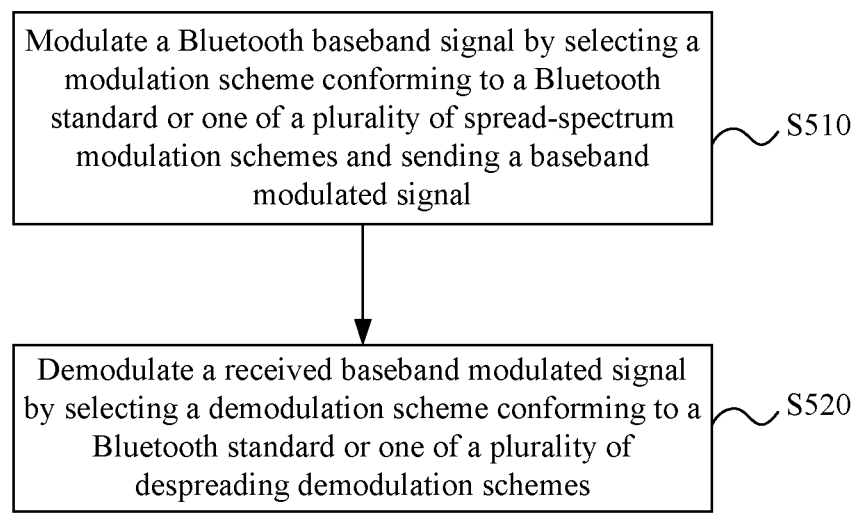
FIG. 5 is a flow diagram of an example multimode transceiving method, in accordance with embodiments of the present invention.

Referring now to FIG. 5, shown is a flow diagram of an example multimode transceiving method, in accordance with embodiments of the present invention. At S510, a Bluetooth baseband signal can be modulated by selecting a modulation scheme conforming to a Bluetooth standard, or one of a plurality of spread-spectrum modulation schemes and sending a baseband modulated signal. For example, a plurality of spread-spectrum modulation schemes may adopt spreading sequences with the same rate to spread a Bluetooth baseband signal in order to a spread signal with its symbol rate being the same as the chip rate of the Bluetooth baseband signal. Chips of the spread signals that correspond to different spread-spectrum modulation schemes may have different symbol amounts. For example, a plurality of spread-spectrum modulation schemes can adopt spreading sequences with different rates or types.

At S520, a received baseband modulated signal can be demodulated by selecting a demodulation scheme conforming to a Bluetooth standard, or one of a plurality of despread demodulation schemes. The despread demodulation schemes can correspond to a plurality of predetermined spread-spectrum modulation schemes. For example, a correlation signal can be acquired by associating a portion of a Bluetooth data packet access code and a corresponding spreading sequence of a plurality of spread-spectrum modulation schemes with the baseband modulated signal, and determining a demodulation scheme based on the correlation signal.

In this way, a Bluetooth baseband signal can be modulated by selecting one of a plurality of spread-spectrum modulation schemes to obtain a physical layer data packet with enhanced performance. The physical layer data packet with enhanced performance can be received based on a spreading sequence. Thus, compatibility with the Bluetooth standard can be achieved, as well as improvement in the communication sensitivity of a mesh network.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A multimode receiving device configured to receive a standard Bluetooth data packet and a physical layer data packet with enhanced performance, the multimode receiving device comprising:
   a) a receiving circuit configured to convert a received radio frequency signal to a baseband modulated signal;
   b) a demodulation circuit configured to select a demodulation scheme that conforms to a Bluetooth standard or one of a plurality of despread demodulation schemes, in order to demodulate said baseband modulated signal;
   c) said plurality of despread demodulation schemes being configured to correspond to a plurality of predetermined spread-spectrum modulation schemes; and
   d) wherein said plurality of spread-spectrum modulation schemes converts a Bluetooth baseband signal to a spread signal with its chip rate being the same as a symbol rate of said Bluetooth baseband signal.

2. The multimode receiving device of claim 1, wherein said demodulation circuit configured to:
   a) acquire a correlation signal by associating a portion of a Bluetooth data packet access code and a corresponding spreading sequence of said plurality of spread-spectrum modulation schemes with said baseband modulated signal; and
   b) determine a demodulation scheme based on said correlation signal.

3. The multimode receiving device of claim 2, wherein said demodulation circuit is configured to select said demodulation scheme with said correlation signal being greater than a predetermined threshold to demodulate said baseband modulated signal.

4. The multimode receiving device of claim 1, wherein said plurality of spread-spectrum modulation schemes is configured to adopt spreading sequences with different symbol rates or types.

5. The multimode receiving device of claim 1, wherein chips of said spread signals corresponding to different spread-spectrum modulation schemes have different symbol amounts.

6. The multimode receiving device of claim 4, wherein said spreading sequence is a pseudo-random sequence.

7. The multimode receiving device of claim 4, wherein said spreading sequence is a sequence with a predetermined length, and said different spread-spectrum modulation schemes have different spreading sequence lengths.

8. The multimode receiving device of claim 1, wherein said demodulation circuit comprises:
   a) a plurality of despread demodulator, wherein each despread demodulator is configured to demodulate said baseband modulated signal, and to output a corresponding demodulated signal based on one of said plurality of despread demodulation schemes;
   b) a demodulator configured to demodulate said baseband modulated signal, and to output a corresponding demodulated signal based on said Bluetooth standard demodulation scheme;
   c) a mode matching correlator configured to acquire a correlation signal by associating a portion of a Bluetooth data packet access code and a corresponding spreading sequence of a plurality of spread-spectrum modulation schemes with said baseband modulated signal, and to output a mode selection signal based on said correlation signal; and
   d) a demodulated signal selector configured to output one demodulated signal based on said mode selection signal.

9. The multimode receiving device of claim 8, wherein said mode matching correlator comprises:
   a) a plurality of correlators configured to output correlation signals by associating said baseband modulated signal with a portion of a Bluetooth data packet access code that corresponds to said correlator or a spreading sequence; and
   b) a plurality of threshold comparators corresponding to said correlators and being configured to output a corresponding mode selection signal when said correlation signal output by said corresponding correlator is greater than a predetermined threshold.

10. The multimode receiving device of claim 1, wherein said Bluetooth standard is a Bluetooth Low Energy (BLE) standard.

11. A multimode transmitting device being configured to transmit a standard Bluetooth data packet and a physical layer data packet of enhanced performance, the multimode transmitting device comprising:
   a) a modulation circuit configured to modulate a Bluetooth baseband signal by selecting a modulation scheme conforming to a Bluetooth standard or one of a plurality of spread-spectrum modulation schemes, and to output a baseband modulated signal;
   b) a receiving circuit configured to convert said baseband modulated signal to a radio frequency signal; and
   c) wherein said plurality of spread-spectrum modulation schemes converts a Bluetooth baseband signal to a spread signal with its chip rate being the same as a symbol rate of said Bluetooth baseband signal.

12. The multimode transmitting device of claim 11, wherein said plurality of spread-spectrum modulation schemes adopts spreading sequences with different symbol rates or types.

13. The multimode transmitting device of claim 11, wherein chips of said spread signals corresponding to different spread-spectrum modulation schemes have different symbol amounts.

14. The multimode transmitting device of claim 12, wherein said spreading sequence is a pseudo-random sequence.

15. The multimode transmitting device of claim 12, wherein said spreading sequence is sequence with a predetermined length, and said different spread-spectrum modulation schemes have different spreading sequence lengths.

16. The multimode transmitting according to anyone of claim 11, wherein said Bluetooth standard is a Bluetooth Low Energy (BLE) standard.

17. A multimode transceiving method, comprising:
   a) modulating a Bluetooth baseband signal by selecting a modulation scheme conforming to a Bluetooth standard or one of a plurality of spread-spectrum modulation schemes and sending a baseband modulated signal;

b) demodulating a received baseband modulated signal by selecting a demodulation scheme conforming to a Bluetooth standard or one of a plurality of despread demodulation schemes, wherein said plurality of despread demodulation schemes correspond to a plurality of predetermined spread-spectrum modulation schemes; and c) wherein said plurality of spread-spectrum modulation schemes converts said Bluetooth baseband signal to a spread signal with its chip rate being the same as a symbol rate of said Bluetooth baseband signal.

* * * * *